T. J. GLOVER & J. B. LABER.
HOSE SUPPORT.
APPLICATION FILED SEPT. 29, 1906.
994,455.
Patented June 6, 1911.
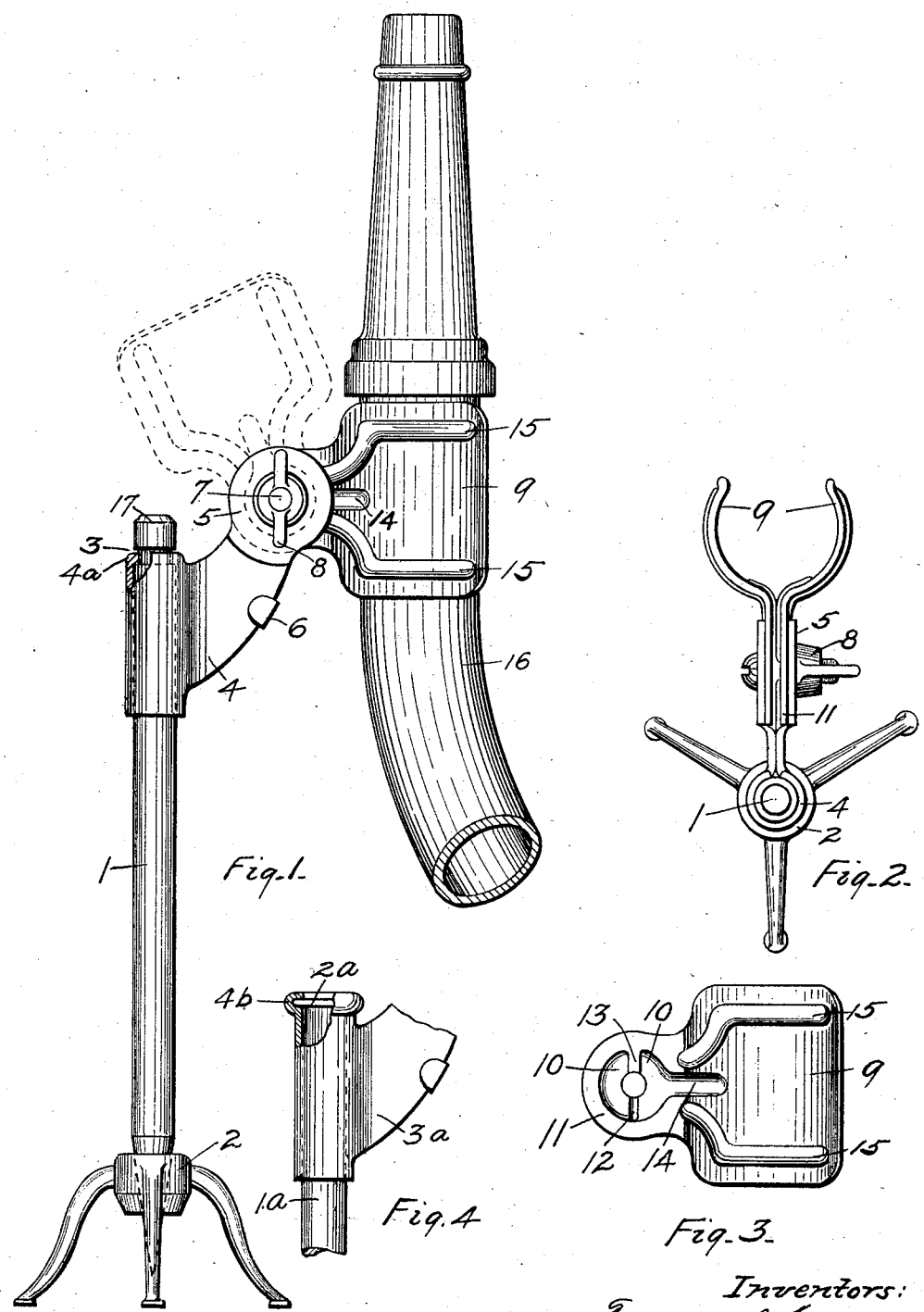

UNITED STATES PATENT OFFICE.

TRUMAN J. GLOVER AND JOHN B. LABER, OF PORTLAND, OREGON.

HOSE-SUPPORT.

994,455.  Specification of Letters Patent.  Patented June 6, 1911.

Application filed September 29, 1906. Serial No. 336,746.

*To all whom it may concern:*

Be it known that we, TRUMAN J. GLOVER and JOHN B. LABER, both of Portland, in the county of Multnomah and in the State of Oregon, have invented a certain new and useful Improvement in Hose-Supports, and do hereby declare that the following is a full, clear, and exact description thereof, reference being had to the accompanying drawings, in which—

Figure 1 is a side elevation constructed in accordance with our invention and with the hose inserted therein. Fig. 2 is a plan view. Fig. 3 is a detail of one of the curved holders for the hose. Fig. 4 is a side elevation of a part of the pin and bracket showing a modified form of securing the one to the other.

Our invention relates to a support for the pipe or nozzle of a sprinkler hose and has for its objects a means of supporting the hose nozzle in such manner that it may readily be shifted to discharge in any desired direction, thus performing the work of a sprinkler: means for easily changing the direction of the discharge while the operator is situated at a distant point: means for irrigating corners and narrow places without constant personal attention, and parts so formed as to be cheaply manufactured by methods now in common use.

The device consists of a pointed pin 1 designed to be pressed into the ground or supported by a tripod 2 and containing near its upper end a groove 3. Around the pin 1 is folded or crimped a sheet metal bracket 4 having its upper edge 4ª forced into the groove 3, thus preventing longitudinal movement, and having its two arms 5 forked and perforated, the bracket being adapted to revolve freely on the pin 1. On the curved edge of one of the arms 5 is an extension 6 adapted to be bent around the adjacent edge of the other arm and thus secure the two arms together without the necessity of riveting or other fastening. Through the perforations of the arms 5 is passed a screw or bolt 7 on which is screwed a wing nut or thumb screw 8 adapted to clamp the two arms together. Between the ends of the two arms 5 and secured by the screw 7 are inserted two holders 9 formed to receive the hose or nozzle between their outer curved ends and adapted to rotate on the screw 7 as a center and be clamped in any fixed position or left loose so that they may be moved by operating the hose from a distant point. The dotted lines show another position of the holders 9. The perforated ends of the holders 9 are concaved at 10 thus permitting only their outer margin 11 to contact with the arms 5 thus increasing the angle of friction between the arms of the bracket 5 and faces of the holders 9. The two holders 9 may be united at their point of contact with each other or be made all in one piece of the same shape shown without departing from the principles of our invention. In the perforated ends of 9 are also formed a groove 12 and a ridge 13, by which means, when the two holders are placed in their relative positions the ridge in one will enter the groove in the other and thus retain the holders 9 in their correct relative positions. The concave bead 14 and convex beads 15 serve to stiffen the holders 9. By this means by inserting either the hose or nozzle between the holders the same is supported in any desired position, the hose resting on the ground, thereby preventing rotation on a vertical axis, and the wing nut being slightly tightened thus preventing rotation on a horizontal axis. The direction of discharge may be changed at will by picking up and operating the hose at some distance from the holder which is a useful feature when the nozzle axis is vertical and in operation.

The upper end 17 of the rod 1 extends above the bracket 4 and furnishes a means by which the rod may be driven into hard ground, boards or other somewhat hard material.

The modification shown in Fig. 4 may be used without departing from the principles of our invention it being desirable in some cases because of various facilities for manufacturing. In this form a head 2ª is formed on the rod 1ª and the bracket 3ª is crimped around the head as shown at 4ᵇ.

The supporting base 2 which may be a tripod is designed to support the rod 1 in a vertical position in cases where the ground may be hard or where it is desirable to place the device on a cement walk or other hard material, the rod 1 being removed from the base 2 when desired.

Having thus described our invention, what we claim is:—

In a hose support, the combination of a vertical rod, and a sheet metal bracket having a tubular member journaled to turn freely on the rod, the rod and tubular member having interlocking portions that hold the bracket from endwise movement in either direction on the rod, and the bracket having a hose-supporting member that extends laterally from the rod below the top thereof to expose the top to blows to drive the rod into the ground.

In testimony that we claim the foregoing we have hereunto set our hands.

TRUMAN J. GLOVER.
JOHN B. LABER.

Witnesses:
R. CHILCOTT,
J. McNAUGHTON.

Copies of this patent may be obtained for five cents each, by addressing the "Commissioner of Patents, Washington, D. C."